April 28, 1931.  W. L. SEMON  1,802,985
COMPOSITE PRODUCT
Filed Jan. 16, 1930
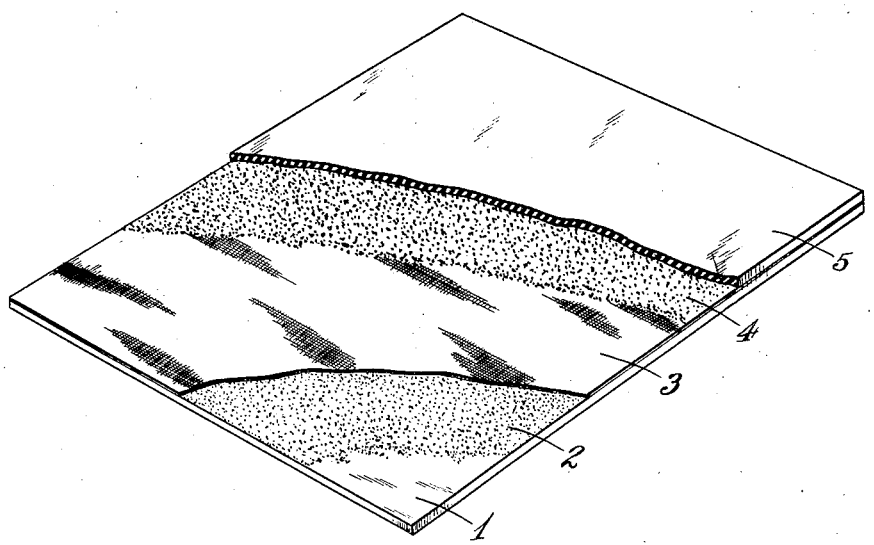
Inventor
Waldo L. Semon
By Eakin & Avery
Attys.

Patented Apr. 28, 1931

1,802,985

UNITED STATES PATENT OFFICE

WALDO L. SEMON, OF CUYAHOGA FALLS, OHIO, ASSIGNOR TO THE B. F. GOODRICH COMPANY, OF NEW YORK, N. Y., A CORPORATION OF NEW YORK

COMPOSITE PRODUCT

Application filed January 16, 1930. Serial No. 421,317.

This invention relates to the manufacture of composite products comprising celluloid or a similar cellulose derivative attached to some other material, and has as its object the adhesion of celluloid to such other materials.

It is well known that cellulose ester products, hereinafter referred to generically as "celluloid", cannot be caused to adhere to such materials as rubber, ebonite, or bakelite, the usual adhesives failing either on the celluloid surface, or on the surface of the other material. Rubber cement, for example, fails to stick to celluloid, whereas a cellulose ester cement fails to stick to rubber, and glue will stick to neither celluloid nor rubber.

The process of this invention produces satisfactory adhesion of celluloid to almost any other material, such as rubber, ebonite, bakelite, shellac compositions, wood, metal, glass, etc. by the interposition of a thin layer preferably of a flexible material to the opposite faces of which both the celluloid and the other material may be caused to adhere. For example, fabric, paper, metal foil, or a similar material may be stuck to celluloid by means of a solution of a cellulose ester in acetone, and to rubber by means of a solution of rubber in benzol. However, care must be taken if the intermediate material is permeable not to impregnate it completely with either adhesive, for in that case the entire surface will be coated by such adhesive and may not adhere satisfactorily to the other material. It has been found that such permeable materials as fabric may successfully be employed by adopting one or the other of the two following procedures: To adhere A to B, moisten a sheet of permeable material with a solvent for A, and apply it to A with sufficient pressure to enable A, softened by the solvent, to flow into intimate contact with its surface. Then apply, either to B, or to the other side of the intermediate material, an adhesive solution of B, and apply B to the intermediate material. Alternatively, apply an adhesive solution of A to the surface of A, and when the adhesive is almost dry, apply the sheet of permeable intermediate material. Apply B to the other side of the intermediate material as before. In following either of the above outlined procedures, A is sufficiently soft, when brought into contact with the intermediate material, to adhere tenaciously thereto, but not sufficiently soft to impregnate it completely. B may then obviously be applied thereto with any appropriate adhesive in the customary manner. If the intermediate material is not permeable no special precautions need be observed, the celluloid and the other material being applied to the two surfaces thereof in any convenient manner, with the appropriate adhesives.

The product formed by the above-described process is illustrated in the accompanying drawing, portions of the structure being broken away to show the relationship of the various layers of the assembled material. The base 1 may be a sheet of celluloid, in which case the layer 2 is an adhesive celluloid cement uniting the fabric layer 3 to the base 1. The other surface of the fabric, in turn, is impregnated with an adhesive cement 4 of rubber or a rubber isomer, as is more fully described below, this layer of cement serving to unite the fabric 3 to the overlying layer of rubber 5. The several layers thus united to one another constitute a firmly adhering structural unit.

In the practice of this invention it is obvious that the cellulose derivative may be either A or B of the procedures above, since it is quite immaterial which material is first applied to the intermediate material. It is also obvious that the adhesive solutions of A or B may be actual solutions of the materials A or B, or may comprise such other adhesives as adhere well to the respective material (A or B) and the intermediate layer. Heat-plastic rubber derivatives, such as the heat-plastic product resulting from the exothermal reaction of rubber with a sulphonic acid or sulphonyl chloride, and described by Harry L. Fisher in the United States Patent No. 1,605,180, granted November 2, 1926, have been found to be particularly valuable for the adhesion of the intermediate material to rubber, wood, metal, etc. Such rubber derivatives may be prepared, for example, by admixing 100 parts of rubber with 7½ parts of p-phenol sulphonic acid and heating the mixture in a compact mass for four hours or more at a temperature of 250° to 290° F. The temperature in the interior of the mass rises to about 390° to 430° F. during the reaction, which is considered complete two hours after the maximum temperature is attained. After washing to remove the acid, the product is found to be a more or less hard, tacky, balata-like material which contains carbon and hydrogen in the same molecular ratio as the raw rubber, but which is less unsaturated than rubber. It softens on heating, and can readily be worked on hot mill rolls, is soluble in rubber solvents, such as benzol or gasolene, but insoluble in water, alcohol or acetone. Similar products may be prepared by heating rubber with other sulphonic acids, with sulphonyl chlorides, sulphuric acid, and other isomerizing agents. These products, however produced, are hereinafter termed heat-plastic rubber isomers, the term including materials the main constituent of which consists of a tacky heat-plastic product containing carbon and hydrogen in the same ratio as rubber, but being less chemically unsaturated than rubber.

The precise sequence of operations and selection of adhesives in any given case will be governed by practical considerations. Examples illustrating various possibilities follow:

*To adhere celluloid to rubber*

*Example 1.*—A close-woven fabric is moistened with acetone and rolled firmly into the surface of a sheet of celluloid. The exposed face of the fabric is coated with an air-curing rubber cement, which is allowed to dry, and a sheet of vulcanized rubber, also coated with cement, is applied with a slight pressure. After the lapse of sufficient time to insure the complete cure of the rubber cement, the celluloid and rubber are found to adhere firmly to the fabric.

*Example 2.*—A closely-woven fabric is coated on one side with a plastic unvulcanized rubber composition by frictioning in a calender in the usual manner. A sheet of unvulcanized rubber composition is then applied to the rubber coating on the fabric, and the composite sheet thus obtained is vulcanized, say in a press. An adhesive solution of a cellulose ester is applied to the uncoated side of the fabric, and a sheet of celluloid quickly applied thereto.

*Example 3.*—An adhesive solution of a cellulose ester is applied to the surface of a sheet of celluloid. A sheet of tough strong paper is rolled onto the coated surface. The exposed surface of the paper is coated, say by spraying or dipping, with a uniform layer of an air-curing latex composition, which is allowed to dry thereon and is vulcanized by storage in a warm room.

*Example 4.*—A fine fabric or a thin aluminum foil is applied to the surface of sheet of celluloid by means of a nitrocellulose cement as described in Examples 1 or 3 above. A solution of a tough, heat-plastic rubber isomer is applied to the free surface of the fabric or foil, and when it is almost dry, a sheet of vulcanized rubber which has been moistened with benzol or gasolene is rolled into contact therewith.

*To adhere celluloid to ebonite, bakelite, metal, wood, etc.*

*Example 5.*—Apply a fabric to a celluloid surface as in Example 1, and apply to the exposed surface thereof an alcoholic solution of shellac. The ebonite or other material is also coated with shellac, and the surfaces brought together under pressure when the shellac is almost dry.

*Example 6.*—A metal, wood or other similar surface is covered with glue and a sheet of paper applied thereto. When the glue has set, the exposed surface of the paper is coated with an adhesive solution of a cellulose ester, to which is applied a sheet of celluloid.

It is to be understood that the above examples are merely illustrative and that this invention is not limited thereto. For the sake of simplicity the materials employed in the examples were supposed to be in sheet form, but the shape or form of the surfaces of the materials is obviously immaterial, the method of this invention being applicable in general to the adhesion of celluloid to other materials of the character described.

I claim:

1. The method of manufacturing a composite product comprising celluloid and another material, which comprises interposing a thin layer of an intermediate substance between the celluloid and the other material, applying adhesives between the respective surfaces, and uniting the layers under pressure.

2. The method of manufacturing a composite product comprising celluloid and another material, which comprises interposing a thin layer of a permeable fibrous substance between the celluloid and the other material, applying adhesives between the respective surfaces, and uniting the layers under pressure.

3. The method of manufacturing a composite product comprising celluloid and rubber, which comprises interposing a thin layer of a permeable fibrous substance between the celluloid and the rubber, applying adhesives between the respective surfaces, and uniting the layers under pressure.

4. The method of manufacturing a composite product comprising celluloid and rubber, which comprises interposing a layer of fabric between the celluloid and the rubber, applying adhesive between the respective surfaces, and uniting the layers under pressure.

5. The method of manufacturing a composite product comprising celluloid and rubber, which comprises adhering celluloid to one face of a permeable fibrous material by means of a solution of celluloid and adhering rubber to the opposite face thereof by means of a solution of a heat-plastic rubber isomer.

6. A composite product comprising celluloid and rubber, attached to opposite faces of a thin layer of an intermediate substance, respectively by a celluloid solution and by a film of a heat-plastic rubber isomer.

7. A composite product comprising celluloid and rubber, attached to opposite faces of a fabric, respectively by a celluloid solution and by a film of a heat-plastic rubber isomer.

In witness whereof I have hereunto set my hand this 9th day of January, 1930.

WALDO L. SEMON.